United States Patent [19]

Myers

[11] 4,353,502

[45] Oct. 12, 1982

[54] REMOTE CONTROLLING

[75] Inventor: Garrett R. Myers, Brighton, Mass.

[73] Assignee: Marian B. Myers, Horseheads, N.Y.

[21] Appl. No.: 131,621

[22] Filed: Mar. 19, 1980

[51] Int. Cl.³ .................. H04M 11/00; G05D 23/00
[52] U.S. Cl. .................................... 236/47; 179/2 A; 236/51; 340/825.06
[58] Field of Search ........................ 236/46 R, 236/47, 51; 307/66; 179/2 A; 340/147 R

[56] References Cited

U.S. PATENT DOCUMENTS

| | | | |
|---|---|---|---|
| 4,021,615 | 5/1977 | James et al. | 340/147 R |
| 4,077,566 | 3/1978 | Bradford | 165/16 |
| 4,174,064 | 11/1979 | Pratt, Jr. | 236/51 X |

Primary Examiner—William E. Wayner
Attorney, Agent, or Firm—Charles Hieken

[57] ABSTRACT

A temperature controlling system (10) is normally controlled by a thermostat that is superseded by a remotely controlled thermostat (21) in response to a remote control signal transmitted over telephone lines that retains control for eight hours established by an eight-hour clock (14). A response oscillator with warning thermostat (13) provides an answering signal indicating that the superseding thermostat is exercising control over the temperature controlling system of pitch which is varied to indicate control and distinctly lower when the warning thermostat indicates the temperature is less than a predetermined value.

18 Claims, 3 Drawing Figures

REMOTE CONTROLLING

BACKGROUND OF THE INVENTION

The present invention relates in general to remote controlling and more particularly concerns novel apparatus and techniques for using telephone lines and terminals for temperature control to provide a convenient meand for controlling and/or monitoring conditions, such as temperature, at a remote location. The apparatus is reliable, relatively inexpensive and consumes relatively little power.

An important aspect of national energy policy is energy conservation. To this end it is desirable to minimize the use of energy for maintaining a desired temperature in unoccupied locations. Thus, clocked thermostats have been used for many years to change the temperature setting in a particular area at predetermined times each day corresponding to the times when the nature of the occupancy of the temperature-controlled environment changes. A disadvantage of this arrangement is that these changes not infrequently occur at irregular times. One approach is to change the thermostat each time the environment becomes occupied and unoccupied. A practical disadvantage of this approach is that the unoccupied temperature differs from the occupied temperature by an increment less than necessary because of the discomfort experienced while restoring the temperature to the occupied value.

Accordingly, it is an important object of this invention to provide improved methods and means for remote controlling.

It is a further object of the invention to achieve the preceding object with apparatus that is convenient to use, reliable, relatively inexpensive, dissipates relatively little power and may be connected safely and relatively easily.

It is a further object of the invention to achieve one or more of the preceding objects with apparatus that uses energy available from thermostat terminals to which it is connected.

It is a further object of the invention to achieve one or more of the preceding objects while receiving control signals over a telephone line and signalling the controller of availability for receiving a control signal and acknowledging receipt of it.

It is a further object of the invention to achieve one or more of the preceding objects while providing to the remote location an indication of a potentially unsatisfactory condition, such as a temperature that is too low.

It is a further object of the invention to achieve one or more of the preceding objects with a process that is relatively simple to implement by an unskilled controller.

It is still a further object of the invention to enable local disablement and remote enablement of a temperature control system.

SUMMARY OF THE INVENTION

According to the invention, there is a first normally operative control means for establishing a first predetermined condition at a first location, for example, a locally controlled room thermostat for establishing a predetermined temperature at the first location. There is second control means at said first location for controlling said first condition in response to a remote control signal from a second location for overriding the first condition, such as a remotely controlled thermostat at the first location, and means for coupling the second control means to the system to be controlled at the first location, such as to the thermostat terminals. Preferably, there is clocking means responsive to the occurrence of a remote control signal for establishing a predetermined time interval in which the second control means exercises control over the first condition and then releases control to the first control means.

A feature of the invention resides in a rechargeable battery providing operating power to the apparatus while being recharged through the energy from the system controlled by the second control means when under the control of the first control means when the system is not operated through a trickle-charging current below the threshold value necessary to operate the system.

Still another feature of the invention is the provision of audible signals to the remote location signifying information, such as receipt of a remote control signal, that the system is activated, or that the temperature is dangerously low. Another feature of the invention resides in means for testing the system with a telephone connected to the line connected to the apparatus.

Numerous other features, objects and advantages of the invention will becom apparent from the following specification when read in connection with the accompanying drawing in which:

DETAILED DESCRIPTION OF PREFERRED EMBODIMENTS

Figure 1:
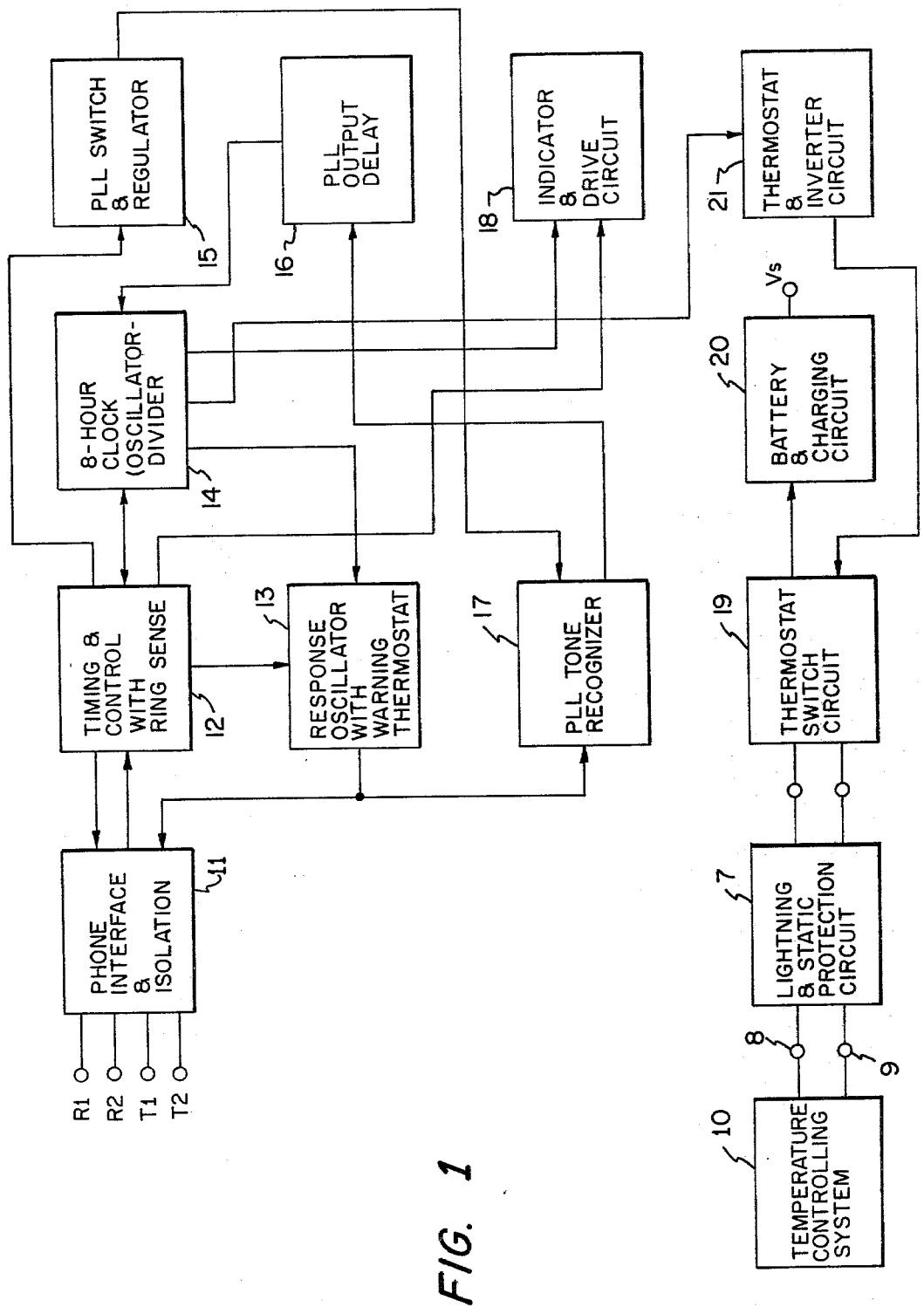
FIG. 1 is a block diagram illustrating the logical arrangement of a system according to the invention.

With reference now to the drawing and more particularly FIG. 1 thereof, there is shown a block diagram illustrating the logical arrangement of a system according to the invention. A temperature controlling system 10 normally operated by the thermostat switch connected across terminals 8 and 9 to operate a normally open relay with local energizing power supply in the temperature controlling system, such as a heating or cooling system, is operated by the system when terminals R1 and R2 receive a ringing signal from the telephone ring circuit at the location and terminals T1 and T2 receive a predetermined tone over the telephone lines to which they are connected at the location. Phone interface and isolation circuitry 11 intercouple the four terminals connected to the ring and telephone line circuits with the apparatus including timing and control with ring senses circuitry 12. This circuitry produces an off-hook signal to connect the apparatus to the calling telephone and start response oscillator 13 with a warning thermostat to provide an answering tone through phone interface and isolation circuitry 11 to the telephone lines having a first pitch to indicate readiness to receive a remote control signal, a second lower pitch to indicate that the temperature is dangerously low and a variable pitch that modulates the answering tone to indicate that the apparatus has already been activated. Timing and control with ring sense circuitry 12 also conditions eight-hour clock 14 to enable the apparatus for an eight-hour interval when a remote control signal is received, thereafter releasing control of temperature controlling system 10 to the conventional thermostat.

After the answer tone stops, timing control with ring sense circuitry 12 provides a signal to phase locked loop switch and regulator 15 that conditions phase locked loop tone recognizer 17 so that upon receipt of the remote control signal tone, it provides an output signal that is delayed by the phase locked loop output delay circuitry 16, and the delayed signal applied to eight-hour clock 14 to start that clock.

The delay circuit includes a time integrator that requires a detected tone for two seconds or longer before activating the eight-hour clock 14. This feature is important for the security of the system. The user must know the proper operational sequence and the proper tone frequency (or touch tone number). The proper frequency must be transmitted at the proper time for the proper duration. The system accommodates a reasonable margin; for example, a tone of at least two seconds duration must be received within a six second window.

When the eight-hour clock 14 is operating, its output prior to division is fed to indicator and drive circuit 18 to produce a pulsing indication that the apparatus is actuated. This pulsed operation permits status indication for eight hours witout discharging the battery. When the system is activated, the battery may not be charging. The same oscillator in eight-hour clock oscillator-divider 14 that operates the divider, modulates the answer tone and drives the pulsed visual indicator and drive circuit 18.

Eight-hour clock 14 also enables thermostat and inverter circuit 21 so that the thermostat therein may enable thermostat switch circuit 19 to essentially short circuit terminals 8 and 9 when temperature controlling system 10 is to be operated.

When temperature controlling system 10 is not operated, there is an a-c voltage of substantially 24 volts between terminals 8 and 9 that is coupled through thermostat switch circuit 19 to battery and charging circuit 20 to trickle charge the battery therein with a current sufficiently small so that the relay operated when terminals 8 and 9 are short circuited remains open.

Figure 2A:
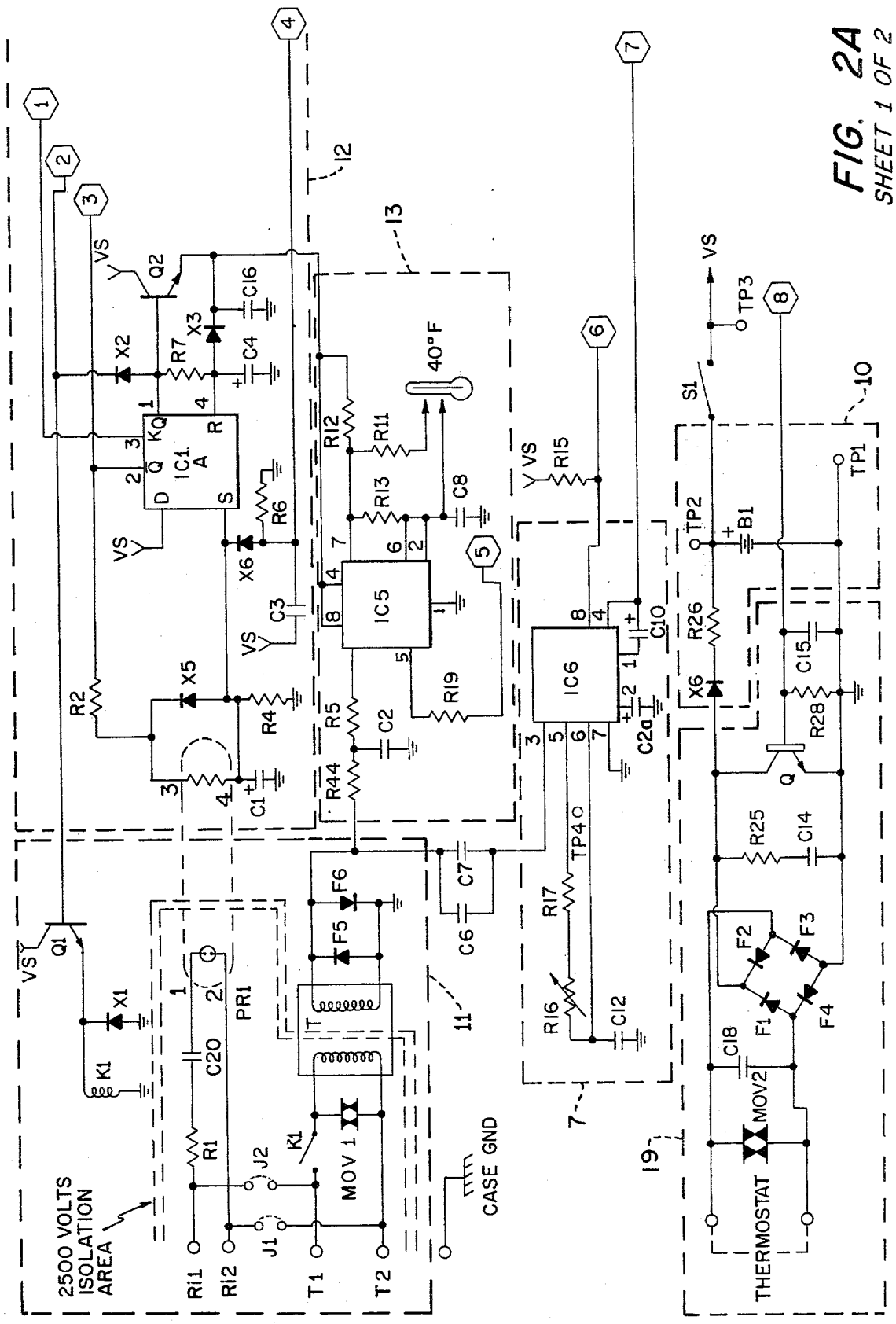
FIGS. 2A and 2B is a schematic circuit diagram of a preferred embodiment of the invention.
Figure 2B:
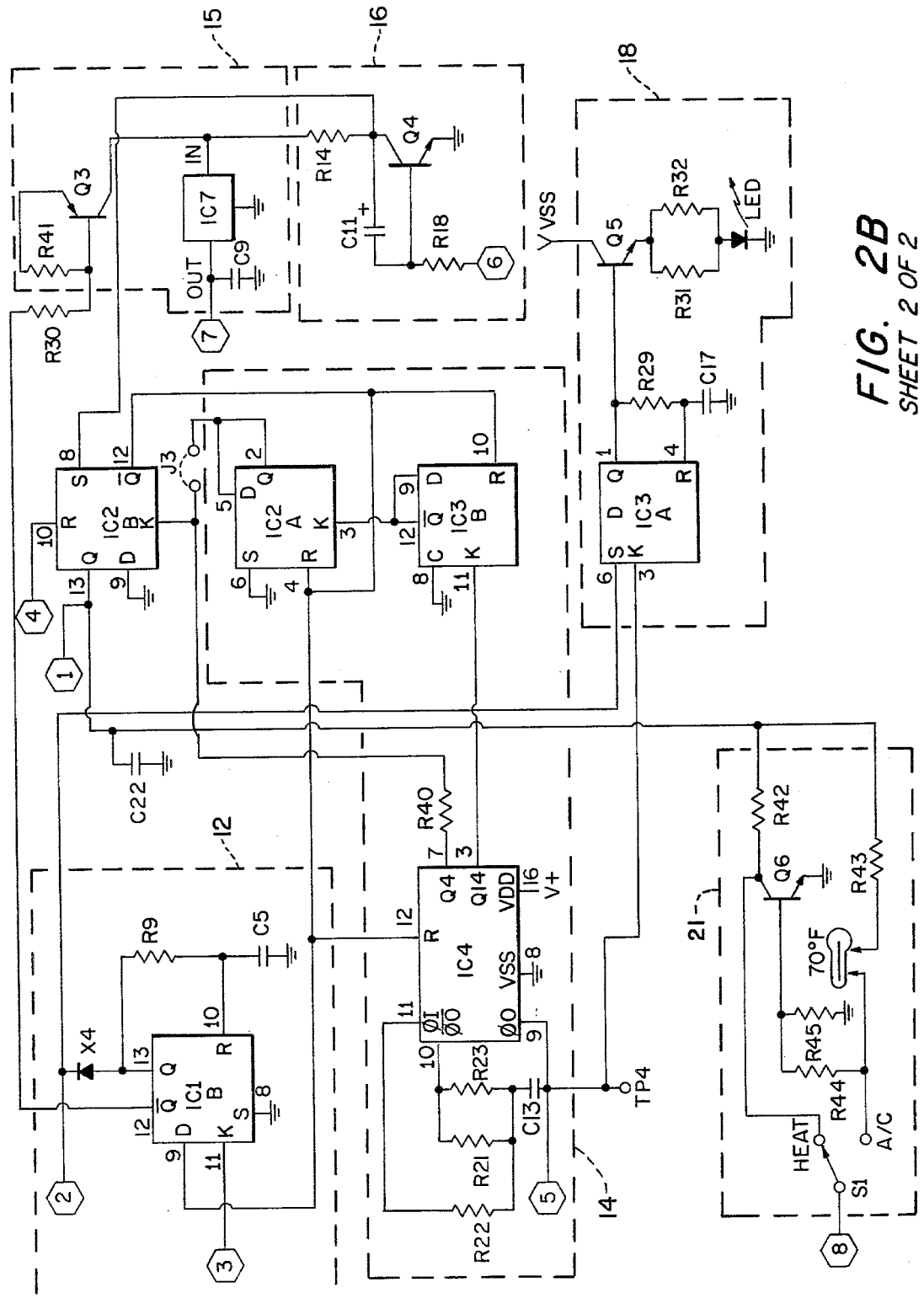

Referring to FIGS. 2A and 2B, there is shown a schematic circuit diagram of a preferred embodiment of the invention. Since those skilled in the art will be able to practice the invention by assembling the specific embodiment shown in FIGS. 2A and 2B using the parameter values set forth in the parts list below, the discussion which follows briefly describes the mode of operation. The broken lines embrace circuitry which corresponds essentially to the correspondingly numbered blocks in the block diagram of FIG. 1.

The occurrence of a ring signal between terminals Ri1 and Ri2 causes the neon bulb in photo relay PR1 to glow and lower the resistance of the illuminated photosensitive resistor therein and charge capacitor C1 after a few rings to a level sufficient to trigger the bistable circuit IC1A of a first integrated circuit connected as a one-shot multivibrator with approximately a 10-second period. The Q output of this one-shot is connected to the base of transistor Q1 through diode X2 to turn transistor Q1 on and operate relay K1 so that the relay arm connects the primary of transformer T across phone lines T1 and T2 to produce an off-hook signal, causing the ring signal to cease. The calling phone is then connected to the apparatus.

The Q output of the one-shot is also coupled to integrated circuit IC5 through transistor Q2. Integrated circuit IC5 and associated components form a tone oscillator that is coupled to the phone lines connected to terminals T1 and T2 through transformer T. The tone oscillator then produces a tone of about 2 kHz to signal the caller that the apparatus has been connected. If the temperature is below a predetermined low limit value, typically 40° F., the 40° F. thermostat connects resistor R11 across terminals 2 and 7 to significantly lower the pitch of the tone to typically 560 Hz and thereby signal the caller that the termperature may be dangerously low.

When the first one-shot turns off, the signal from the Q output triggers the second one-shot comprising integrated circuit portion IC1B, latching relay K1 to remain on with the signal coupled through diode X4 causing transistor Q1 to remain conducting. At the same time the signal on the Q outut of integrated circuit portion IC1B causes transistor Q3 to conduct and thereby turn on integrated circuit IC6. Integrated circuit IC6 and associated circuitry comprises a phase locked loop tuned to a specific touch-tone frequency, such as 1330 Hz. Integrated circuit IC7 functions as a voltage regulator to maintain the operating potential on terminal 4 of integrated circuit IC6 at 5 volts. The transmission of a tone to terminals T1 and T2 corresponding essentially exactly to the frequency of phase locked loop integrated circuit IC6 generated by a touch-tone phone or an acoustically coupled tone key causes the phase locked loop to produce an output signal that is coupled through a delay circuit comprising transistor Q4 and associated circuit components into RS flip-flop integrated circuit portion IC2B and into the first one-shot. The presence of this tone on the telephone lines at the appropriate time for an appropriate time interval sets the flip-flop comprising integrated circuit portion IC2B and the one-shot comprising integrated circuit portion IC1A. When the former is set, it allows the clock oscillator comprising integrated circuit IC4 and associated components to begin operation and enable the thermostat circuit 21. The output of integrated circuit IC4 on terminal 9 is coupled to the input of oscillator circuit IC5 on terminal 5, causing that oscillator to repeat the 2 kHz answertone modulated by a square wave of approximately 2 Hz. This varying signal indicates to the caller that the apparatus has been activated.

The output of integrated circuit IC4 on terminal 9 is also coupled to the K input of integrated circuit portion IC3A which is a one-shot lamp driver that pulses the LED through transistor Q5 while the unit is in operation and illuminates it steadily when the apparatus is in the process of answering a call.

Integrated circuit IC4 is an oscillator and 14-stage binary counter. The last stage of the counter is coupled to two more stages of division. The output of the final stage, which rises 8 hours after integrated circuit portion IC2B is turned on, resets integrated circuit IC2B. Thus integrated circuit portion IC2B remains in the set state for eight hours to enable thermostat circuit 21 for 8 hours, and then resets to then disable thermostat circuit 21. With thermostat circuit 21 operating as transistor Q6 then conducts, the thermostat therein operates temperature controlling system 10 through the heat-a/c switch by causing transistor Q7 to conduct when the 70° F. thermostatic switch changes state to demand heating or cooling to render transistor Q7 conductive, thereby interconnecting terminals 8 and 9 with sufficiently low impedance to operate the relay and temperature controlling system 10 that turns the heating or air conditioning unit unit on until the temperature causes the thermostatic switch to change state and render transistor Q7 nonconductive.

The mercury switch in thermostat switch circuit 19 closes on rising temperature. Thus, when eight-hour clock 14 is activated, providing operating potential to circuit 21, the thermostat will be normally open for hearing, transistor Q6 will then be nonconductive, and current will flow through resistor R42 to the base of transistor Q7, causing it to conduct. When the temperature rises, the thermostatic switch closes, causing current to flow through resistor R43, R44 to the base of transistor Q6, and render it conductive. When transistor Q6 conducts, current flowing through resistor R42 will be shunted to ground, allowing transistor Q7 to become nonconductive. For air conditioning, when the termperature is above the set point, resistor R43 produces current through the thermostatic switch to the base of transistor Q7, causing it to conduct and operate the air conditioning. Transistor Q7 will turn off when the temperature falls below the set point.

When the temperature controlling system 10 is not operating, the 24-volt a-c potential between terminals 8 and 9 is coupled through diodes F1–F4 and diode X6 to trickle charge the battery B1 through resistor R26. A feature of the invention is that the power drain of the circuitry is so small that a two-day trickle charge will allow weeks of idle operation.

The circuitry is electrically connected to the 24-volt a-c thermostat line that is transformer isolated from the main lines. Transformer T1 and photo relay PR1 isolate the thermostat line from the telephone lines so there are no dangerous voltages that can threaten life or telephone equipment. A test reset switch S2 enables the user to test the apparatus from his home phone, and reset it when returning home. The normal temperature controlling system thermostat is typically set for minimum system operation when the inhabitants of the dwelling depart, allowing the temperature to fall or rise to energy-saving uncomfortable levels. The thermostat in thermostat circuit 21 is set to return the temperature to a comfortable level prior to reentry, when the apparatus is activated remotely by telephone.

Static protection devices MOV 1, MOV 2, capacitor C18, resistor R25 and capacitor C14 coact to protect the system from inductive transients from the temperature controlling system during turn on and turn off, burner ignition spikes, static electricity, power line spikes and lightning transients, both from the power lines and the thermostat lines.

Typical parameter values for the circuit of FIG. 2 are set forth in the following parts list:

| PARTS LIST - ELECTRICAL | | |
| --- | --- | --- |
| RESISTORS | VALUE (Ω) | QTY |
| R25 | 100 ½ W | 1 |
| R5, 12, 31, 32, 44 | 1K2 ¼ W | 3 |
| R1, R28, R26, R42, R43, R11, R20 | 5K6 ¼ W | 7 |
| R44, 45, 41, 30, 17, 5, 13 | 12K ¼ W | 7 |
| R40, 14, 19, 6, 18, 15 | 120K ¼ W | 6 |
| R29, 23, 2 | 290K ¼ W | 3 |
| R9, 7, 4, 21, 22 | 1M ¼ W | 5 |
| R16 | 5K POT | 1 |
| CAPACITORS | VALUE (MFD) | QTY |
| C20 | .68 @ 250V MYLAR | 1 |
| C18, 14 | .1 @ 250V | 2 |
| C1, 4, 5, 10 | 6.8 tant | 4 |
| C2 | 3.3 tant | 1 |

| -continued | | |
| --- | --- | --- |
| PARTS LIST - ELECTRICAL | | |
| C11 | 1.0 tant | 1 |
| C24 | 1.0 MYLAR NP | 1 |
| C6, 16, 3, 21, 9, 7, 17, 15, 21, 22 | .05 disc | 8 |
| C12 | .047 MYLAR FILM | 1 |
| DIODES | | QTY |
| F1–F6 | 1N4002 100 PIV 1A | 6 |
| X1–X6 | 1N4148 | 6 |
| TRANSISTORS | | QTY |
| Q1, 2, 4, 5 6 | NPN (2N3904) | 5 |
| Q3 | PNP (2N3906) | 1 |
| Q7 | TIP 121 | 1 |
| INTEGRATED CIRCUITS | | QTY |
| IC1, 2, 3 | 4013 | 3 |
| IC4 | 4060 | 1 |
| IC5 | 555 | 1 |
| IC6 | 567 | 1 |
| IC7 | 78L05CP | 1 |
| LED 1 | LED | 1 |
| MOV1, 2 | 33 VAC, 1A | 2 |
| | DESC. | QTY |
| K1 | RELAY, 6V, 1A | 1 |
| PR1 | PHOTO COUPLER | 1 |
| T | TRANSFORMER 600Ω to 900Ω | 1 |
| B1 | 8V NiCAD CELL | 1 |
| S1, S2 | Form C toggle | 2 |

The apparatus is commercially available from the Whitefield Corporation of Brookline, Massachusetts, and is preferably installed near the existing thermostat of the temperature control system. Upon leaving the home, the user turns the regular thermostat to its lowest setting (highest setting in the summer) and turns switch S2 on. Prior to returning home, the user calls the home phone. The apparatus answers within three rings, producing a steady tone for about 10 seconds. Immediately after the steady tone stops, the user pushes a specific number on a touch-tone phone for about three seconds. If calling from a rotary type phone, the user may use a tone key near the mouth piece for three seconds. The user will then receive a changing tone for about 10 seconds while the LED begins to flash, and the thermostat in thermostat circuitry 21 will cause the temperature controlling system 10 to operate until the present temperature is reached. Upon returning home, the reuser resets the apparatus by opening switch S2. If the phone is called while the system is activated, the caller hears a changing tone and a much lower tone if the temperature sensed is below the warning thermostat set point.

The apparatus may be tested by lifting the phone off the cradle, closing switch S2 and producing the tone for three seconds.

While the invention is especially useful for temperature control, it may also be used for other functions, such as controlling lights, irrigation devices and security systems.

The frequencies selected for the signal tones are important. The difference between the high and low tones is preferably large enough so that the nonmusical ear can readily ascertain the proper status, but not so great as to be outside the range of tones transmitted by the phone system. The modulation of the answer tone by two inputs permits the conveyance of three status indication simultaneously. If the user is unsure of the relative pitch of the answer tone, he may use the supplied tone whistle as a reference because the high tone will be significantly higher and the low tone significantly lower than the whistle tone.

The tone whistle may comprise a reed pitch pipe having a fundamental resonance in the range between 300 and 700 Hz, but is rich in overtones, particularly the third harmonic. A telephone system produces third harmonic distortion because of the carbon microphone characteristics and amplitude leveling devices. Thus, the third harmonic of the pitch pipe transmitted over the telephone line is sufficiently high level for signaling use. A feature of the invention is that the conveniently available 440 Hz standard A above middle C whistle used by musicians for tuning may be used to produce a frequency very close to the 1336 Hz touch tone frequency. This feature may also be useful in connection with signaling telephone answering or other machines over telephone lines.

It is evident that those skilled in the art may now make numerous other uses and modifications of and departures from the specific embodiments described herein without departing from the invention concepts. Consequently the invention is to be construed as embracing each and every novel feature and novel combination of features present in or possessed by the apparatus and techniques herein disclosed and limited solely by the spirit and scope of the appended claims.

What is claimed is:

1. Remote controlling apparatus comprising,
   terminal means for connection to terminals of a system to be controlled normally controlled by first control means,
   second control means for controlling said system,
   means responsive to a remote control signal for selectively connecting said second control means to said terminal means to exercise control over said system,
   and timing means responsive to the occurrence of said remote control signal for enabling said second control means to control said system only for a predetermined time interval.

2. Remote controlling apparatus in accordance with claim 1 wherein said system to be controlled is a temperature establishing system.

3. Remote controlling apparatus in accordance with claim 2 wherein said first control means includes a thermostat that normally controls the temperature at the location of said system to be controlled and said second control means includes a second thermostat that exercises control over said temperature instead of said first control means thermostat in response to said remote control signal.

4. Remote controlling apparatus in accordance with claim 3 and further comprising,
   rechargeable battery means for supplying operating potentials to said apparatus,
   and rectifying circuit means for coupling said rechargeable battery means to said terminal means to enable said battery means to be recharged at a trickle current rate sufficiently low so that when said terminal means are connected to a low voltage source in said system to be controlled through an operable element therein when the controlling thermostat is open the operable element remains not operated.

5. Remote controlling apparatus in accordance with claim 3 wherein said second thermostat is a single preset thermostat set to a comfortable temperature maintainable by heating and cooling systems comprising said system to be controlled.

6. Remote controlling apparatus in accordance with claim 1 and further comprising,
   means for connecting said means responsive to a remote control signal to telephone lines at the location of said system to be controlled.

7. Remote controlling apparatus in accordance with claim 1 wherein said means responsive to a remote control signal includes means actuated only by a remote control signal of predetermined audible tone that may be transmitted over telephone lines occurring within a predetermined limited time interval.

8. Remote controlling apparatus in accordance with claim 7 and further comprising a source of said remote control signal including a resonant mechanical device actuable to produce said tone.

9. Remote controlling apparatus in accordance with claim 8 wherein said mechanical device comprises a reed pitch pipe having a fundamental frequency substantially one-third that of said predetermined frequency that provides a third harmonic thereof corresponding to said predetermined frequency.

10. Remote controlling apparatus in accordance with claim 1 and further comprising clock timing means for restoring control to said first control means after said second control means has exercised control for a predetermined number of hours.

11. Remote controlling apparatus in accordance with claim 10 wherein said timing means includes a clock oscillator that energizes a divider,
    said clock oscillator comprising the means for varying the pitch of said answering tone.

12. Remote controlling apparatus in accordance with claim 11 and further comprising pulsed visual indicating means pulsed by said clock oscillator to provide a visual indication at the location of said system to be controlled indicating control by said second control means.

13. Remote controlling apparatus in accordance with claim 1 and further comprising means including a single switch for turning power on and off, resetting and testing.

14. Remote controlling apparatus comprising,
    terminal means for connection to terminals of a system to be controlled normally controlled by first control means,
    second control means for controlling said system,
    means responsive to a remote control signal for selectively connecting said second control means to said terminal means to exercise control over said system,
    rechargeable battery means for supplying operating potentials to said apparatus,
    and rectifying circuit means for coupling said rechargeable battery means to said terminal means to enable said battery means to be recharged at a trickle current rate sufficiently low so that when said terminal means are connected to a low voltage source in said system to be controlled through an operable element therein the operable element remains not operated.

15. Remote controlling apparatus in accordance with claim 14 and further comprising,
    means for establishing the current drain of said apparatus sufficiently low so that said apparatus remains operative for a number of hours without recharging said rechargeable battery means.

16. Remote controlling apparatus comprising, terminal means for connection to terminals of a system to be controlled normally controlled by first control means, second control means for controlling said system, means responsive to a remote control signal for selectively connecting said second control means to said terminal means to exercise control over said system, indicating means for indicating the status at the location of said system to be controlled including a tone generator for providing an answering tone of first frequency to indicate a first condition and of a second significantly different audible frequency to indicate a second condition, and means for varying the pitch of said answering tone at a predetermined audible frequency to indicate a third condition, all said frequencies being transmittable over telephone lines.

17. Remote controlling apparatus in accordance with clam 16 and further comprising a warning thermostat at a location of said system to be controlled for producing said second frequency when the temperature thereat is below a predetermined set value.

18. Remote controlling apparatus in accordance with claim 16 wherein a single oscillator provides said answering tone.

* * * * *